US010989295B2

(12) United States Patent
Lanz

(10) Patent No.: US 10,989,295 B2
(45) Date of Patent: Apr. 27, 2021

(54) HOUSING WITH TWO ALIGNED HOUSING PARTS FOR A UNIT OF A VEHICLE DRIVE TRAIN

(71) Applicant: ZF Friedrichshafen AG, Friedrichshafen (DE)

(72) Inventor: Hermann Lanz, Frickingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/846,903

(22) Filed: Apr. 13, 2020

(65) Prior Publication Data

US 2020/0347925 A1    Nov. 5, 2020

(30) Foreign Application Priority Data

Apr. 30, 2019  (DE) ...................... 10 2019 206 236.9

(51) Int. Cl.
*F16H 57/021* (2012.01)
*F16H 57/025* (2012.01)
*F16H 57/02* (2012.01)

(52) U.S. Cl.
CPC ......... *F16H 57/021* (2013.01); *F16H 57/025* (2013.01); *F16H 2057/02017* (2013.01)

(58) Field of Classification Search
CPC ............... F16H 57/025; F16H 2057/02017
See application file for complete search history.

(56) References Cited

U.S. PATENT DOCUMENTS

| 4,887,344 A * | 12/1989 | Kurihara ................. B23P 19/10 |
| | | 29/468 |
| 5,687,480 A * | 11/1997 | Khariton ............... F16H 57/025 |
| | | 29/893.2 |
| 2002/0046768 A1 * | 4/2002 | Gonsior ................ F16K 5/0285 |
| | | 137/15.18 |

FOREIGN PATENT DOCUMENTS

| DE | 102014111077 A1 * | 2/2016 | ........... F16H 57/025 |
| WO | WO-2014111250 A1 * | 7/2014 | ......... F16H 57/0447 |

OTHER PUBLICATIONS

Translation DE-102014111077-A1.*

* cited by examiner

*Primary Examiner* — Vicky A Johnson
(74) *Attorney, Agent, or Firm* — Davis & Bujold PLLC; Michael J. Bujold

(57) ABSTRACT

A housing (1) for an assembly in a vehicle drive-train having a first housing component (1A) and a second housing component (1B). The first and second housing components (1A, 1B) are aligned with and coupled to one another. A shaft (6) for supporting a structural element (7) of the assembly is arranged inside the housing. The shaft (6) is supported respectively in the first and the second housing components (1A, 1B). The shaft (6) serves to align the first and second housing components (1A, 1B) relative to one another. A transmission having such a housing (1) is described as is a method for producing such a housing (1).

9 Claims, 3 Drawing Sheets

HOUSING WITH TWO ALIGNED HOUSING PARTS FOR A UNIT OF A VEHICLE DRIVE TRAIN

This application claims priority from German patent application serial no. 10 2019 206 236.9 filed Apr. 30, 2019.

FIELD OF THE INVENTION

The invention relates to a housing for an assembly in a vehicle drive-train, the housing having two housing components that are aligned with one another, as well as a transmission with such a housing and a method for producing such a housing.

BACKGROUND OF THE INVENTION

Assemblies for vehicle drive-trains are known. Such an assembly may be for example a transmission or a drive motor. Such assemblies as a rule have a housing in order to shield structural elements of the assembly from their surroundings and to support the structural elements. Such housings often consist of several individual housing components, which are joined together during the construction of the assembly. During this it is usually important that the housing components are exactly aligned relative to one another. Usual means for aligning two such housing components are cylindrical pins (locating pins) and/or a centering collar.

Housings for assemblies with two housing components are also known, in which a shaft is arranged between the housing components in such manner that one end of the shaft is supported in one housing component and the other end of the shaft in the other housing component. This is often the case in transmissions. In such cases, however, the halves of the housing are not aligned relative to one another by means of the shaft, but instead the position of the shaft is aligned by virtue of the housing components. Thus, here too cylindrical pins or other means must be used for the correct alignment of the housing components.

SUMMARY OF THE INVENTION

Accordingly, the purpose of the present invention is to develop further the prior art.

This objective is achieved by the housing and the transmission proposed in the independent claim(s), as well as the production method proposed in the independent claim(s) for the housing. Preferred embodiments thereof are described in the subordinate claims.

According to these, a housing for an assembly of a vehicle drive-train is proposed. The housing comprises a first housing component and a second housing component. The first and second housing components are aligned and coupled to one another. In particular the housing components are coupled to one another to form a seal so that a lubricant inside the housing cannot leak out by way of the coupling joints of the housing components. The housing also has a shaft for supporting a structural element of the assembly arranged inside the housing. Thus, the shaft passes at least in part though the inside of the housing where the structural element is located and where the shaft supports the structural element. The shaft is supported, respectively, in the first and second housing components. For that purpose, in particular one end of the shaft is supported in one of the housing components and the other end of the shaft is then supported in the other housing component.

In the housing proposed it is now provided that it is precisely this shaft which ensures the alignment of the first and second housing components. Thus, the shaft fulfills a double function: on the one hand the shaft supports the structural element inside the housing and is therefore needed in any case, and on the other hand the shaft ensures the correct alignment of the housing components relative to one another. Consequently, cylindrical pins in particular or other means of aligning the two housing components are not required.

Preferably, no comparable further shafts are provided for aligning the two housing components, i.e. no second, analogous shaft for the two housing components is present. However, if there are three or more housing components and these have to be aligned exactly with one another, then two of the housing components at a time can be aligned by a respective shaft in each case.

The shaft and the two housing components, in their contact areas where they come directly in contact with one another, are therefore dimensioned relative to one another so that during assembly and during later operation of the structural unit in the manner intended, they are and remain sufficiently well aligned with one another. To ensure this, correspondingly exact fits are provided in the contact areas. For example, transition fits are provided there.

Preferably, during the operation of the assembly in the manner intended no torques act upon the shaft. Thus, the shaft does not serve to transmit drive torque. The shaft can be arranged in a fixed position in the housing. Then, in its fitted condition it can neither rotate nor be displaced in the axial direction. Preferably the shaft is a so-termed locking bolt. The locking bolt serves to support a pawl on the locking bolt, or one that can be pivoted or rotated together with the locking bolt. By means of such a locking bolt a driveshaft of the assembly can optionally be fixed in the housing, whereby the driveshaft is rotationally fixed and can be released so that the driveshaft can rotate. For this, depending on its position the locking bolt engages with teeth rotationally fixed to the driveshaft or disengages therefrom. The locking bolt is preferably a parking brake pawl, i.e. a locking bolt for a parking lock. Such parking locks are used in motor vehicles to secure them against inadvertently rolling away when they have stopped. In that case the parking brake pawl is preferably arranged and can rotate or pivot on the shaft used for alignment, which in this application is also called a parking brake bolt. The shaft can then be arranged in the housing on the drive output side, i.e. on the side of a driveshaft of the assembly used as an output shaft.

The assembly can be a motor-transmission assembly. In that case the assembly comprises a drive motor and a transmission. The drive motor is then in particular an electric machine. The electric machine can be operated as a motor or as a generator. The assembly can also be a separate transmission. The transmission can have a fixed gear ratio or a plurality of different, shiftable gear ratios. Correspondingly, the housing is then specifically a transmission housing.

Besides the assembly the vehicle drive-train can also comprise driveshafts for transmitting drive power from the assembly to the propulsion means of the vehicle. Depending on the purpose for which the vehicle is intended, such propulsion means can for example be one or more wheels, caterpillar tracks, propellers or screws. The vehicle drive-train is preferably one for a motor vehicle such as a passenger car or a truck or a powered bus.

Preferably, one of the housing components has a centering collar. In particular the centering collar is circular. The other housing component then has a shoulder that corresponds with the centering collar. In particular the centering collar and the shoulder are mutually complementary. The centering collar and the shoulder also serve to align the two housing components relative to one another. In this case the shaft serves to align the housing components in the circumferential direction of the centering collar. Thus, by means of the shaft at least one rotationally correctly positioned, i.e. polar alignment is ensured. The centering collar and the shoulder then serve to ensure radial alignment relative to the centering collar. The shaft can be positioned radially outside the centering collar. This enables a particularly accurate, rotationally correctly positioned alignment of the housing components. Instead, the shaft can also be arranged radially inside the centering collar. This gives a particularly compact configuration of the housing.

Preferably, the shaft has a larger axial extension than the centering collar. Alternatively or in addition, the shaft can also extend (axially) beyond the centering collar. In that way, during the assembling of the housing, the housing components can, by means of the shaft, on the one hand first be aligned rotationally correctly positioned and on the other hand approximately in the radial direction relative to one another, and only then finally aligned with one another by means of the centering collar and the shoulder.

Preferably the centering collar and the shoulder are arranged on end faces of the housing components opposite one another. Thus, in the assembled condition of the housing these end faces are in contact with one another. On the end faces in each case an opening or recess for the shaft is now provided. Into each opening or recess, respectively, one of the two ends of the shaft is inserted. This insertion of the shaft on each side ensures that the housing components are aligned by means of the shaft.

Preferably, at least one of the housing components has a housing opening. This housing opening serves to allow the passage of a driveshaft of the assembly through the housing component concerned. The driveshaft can therefore be inserted into the assembly, i.e. as an input shaft. However, the driveshaft can also extend out of the assembly as an output shaft. In this case the shaft used to align the two housing components is arranged a distance away from the opening and thus also from the driveshaft. In other words, besides the shaft for aligning the housing components the assembly has the driveshaft radially adjacent to it, which latter extends out of or into the inside of the housing. The driveshaft can serve to draw off or introduce drive power from or into the assembly. Thus, the driveshaft is in particular designed to transmit torque and is mounted rotatably in the housing.

The centering collar can be circular and can be arranged coaxially with the housing opening, i.e. coaxially with the driveshaft. Without the shaft used for alignment, the housing components would be able to rotate relative to one another. Usually, cylindrical pins are then used to ensure the rotationally correct assembling of the housing components. Thanks to the use of the aligning shaft these can now be omitted.

Preferably, one of the housing components is a housing cover. This housing cover closes off the housing at one end, i.e. in the axial direction of the housing. In that way the inside of the housing can be sealed relative to the outside. In particular, the housing cover comprises the opening through which the driveshaft passes. The axial direction of the housing corresponds in particular to the longitudinal direction of the driveshaft.

The transmission also proposed is suitable for a vehicle drive-train. The transmission has at least one transmission stage and a housing for accommodating structural elements of the transmission stage on the inside of the housing. In this case it is provided that as the housing concerned, the proposed housing is used. The shaft used to align the two housing components can form one of the structural elements of the transmission stage. Other structural elements of the transmission stage can be gearwheels. Preferably, however, the shaft is the parking lock bolt. The transmission can be part of the aforesaid motor-transmission structural unit. Instead, the transmission can also be separate.

The method also proposed serves to produce the proposed housing or assembly or transmission. In the method, the following steps are carried out in the sequence indicated:
a) Production of the first housing component and the shaft.
b) Insertion of one end of the shaft into the associated opening or recess in the end face of the first housing component, so that the other end of the shaft projects out of the end face.
c) Production of the second housing component.
d) The two housing components are brought together so that the other end of the shaft is inserted into the associated opening or recess in the end face of the second housing component, in such manner that a first alignment of the housing components relative to one another takes place. Here, the housing components are in particular aligned rotationally correct relative to one another. Likewise, this ensures an alignment of the housing components relative to one another in the radial direction relative to the shaft.
e) Further movement of the housing components toward one another, so that the centering collar on one of the end faces joins the shoulder that corresponds with it on the other end face, which results in a further alignment of the housing components relative to one another. This is in particular the final alignment stage of the housing components.

In a last step the housing components can then be coupled to one another firmly, for example by suitable fastening means.

A driveshaft of the assembly, if present, can also extend between the housing components and be supported in each of them. Such a driveshaft then does not serve to align the housing components. Instead, it is itself aligned by the housing components.

BRIEF DESCRIPTION OF THE DRAWINGS

Below, the invention is explained in greater detail with reference to figures from which further preferred design features emerge. The figures show, represented schematically.

DETAILED DESCRIPTION OF THE PREFERRED EMBODIMENTS

In the figures, the same or at least functionally equivalent components are denoted by the same indexes.

Figure 1:
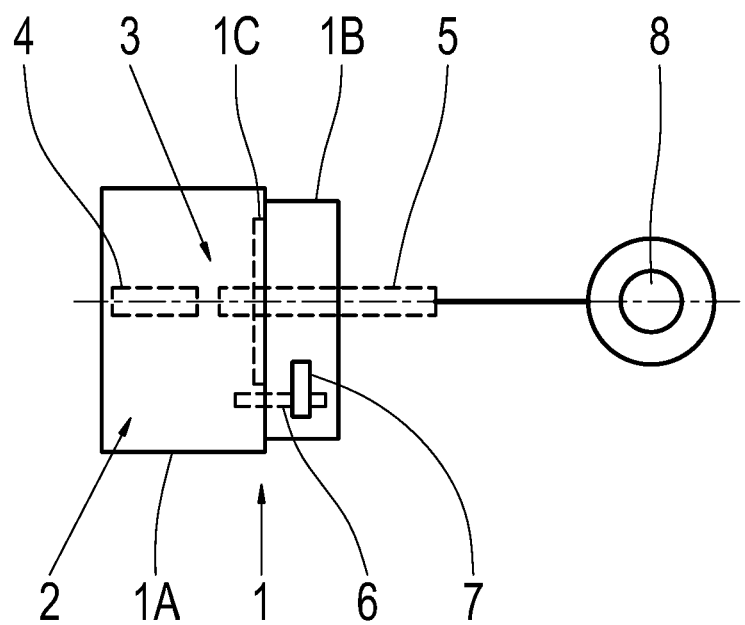
FIG. 1: A vehicle drive-train with an assembly.

The assembly in FIG. 1, shown as an example, is a motor-transmission assembly. The assembly has a housing 1 with the housing components 1A and 1B. The assembly also comprises a drive motor 2, specifically an electric machine, and a transmission 3. The housing component 1B is in the form of a housing cover which closes off the housing 1 at one end.

In FIG. 1, as an example a vehicle wheel 8 is shown, which can be driven by the assembly.

In the first housing component 1A there extends a driveshaft 4 that comes from the drive motor 2. The driveshaft can also be called an input shaft. A further driveshaft 5 passes through a housing opening of the housing 1 and out from the inside of the housing. This driveshaft 5 can also be called an output shaft. The driveshafts 4, 5 can be arranged coaxially with one another. They are drive-coupled to one another by way of structural elements of the assembly. The structural elements form in particular a transmission stage of the transmission. Accordingly, the driveshafts 4, 5 must be exactly aligned with one another. Since the driveshafts 4, 5 are in turn supported rotatably by the housing 1, the housing components 1A, 1B must correspondingly be exactly aligned with one another.

To align the housing components 1A, 1B, one of the housing components (in this case for example the housing component 1B) has a centering collar 1C at one end. The centering collar 1C co-operates with a corresponding shoulder on the opposite end of the other housing component (in this case for example the housing component 1A). The centering collar is circular. The centering collar 1C is positioned coaxially with the driveshaft 4.

In addition, to align the housing components 1A, 1B a shaft 6 is provided. The shaft 6 serves primarily to support a structural element 7 of the assembly. In the present case, for example, the structural element 7 is a parking lock pawl. This is designed to engage in teeth positioned rotationally fixed on the driveshaft 5, in order when necessary to hold the driveshaft 5 rotationally fixed. In that way the vehicle drive-train is blocked and a motor vehicle so equipped is secured by interlocking means against inadvertent rolling away. Thus, the shaft 6 is designed as a parking lock bolt.

To align the housing components 1A, 1B by means of the shaft 6, one end of the shaft 6 is inserted into a recess or opening of the first housing component 1A, and therefore supported therein. Between this shaft end and the recess or opening a correspondingly exact fit is provided. Furthermore, to align the housing components 1A, 1B the other end of the shaft 6 is inserted into a recess or opening of the second housing component 1B, i.e. supported therein. Between that shaft end and that recess or opening a correspondingly exact fit is also provided.

The shaft 6 is arranged radially a distance away from the driveshafts 5 and 6 and is positioned radially outside the shoulder 1C. By virtue of this distance the shaft 6, besides ensuring the radial alignment of the housing components 1A, 1B, also aligns the housing components 1A, 1B in a polar, i.e. rotationally correctly positioned manner. Thus, there is no need for cylindrical pins or other alignment means.

The shaft 6 projects out of the centering collar 1C. It also has a larger axial extension than the centering collar 1C. Thus, during the assembling of the transmission housing 1 and the assembly, one end of the shaft 6 is first inserted into a corresponding opening or recess in one of the housing components 1A, 1B. Then, the housing components 1A, 1B with their corresponding end faces are brought closer together so that the other end of the shaft 6 is inserted into the corresponding opening or recess in the other housing component 1A, 1B. This constitutes a first alignment stage of the housing components 1A, 1B. Finally, a further approach of the housing components 1A, 1B to one another brings the centering collar 1C into contact with the corresponding shoulder, which brings about the definitive alignment of the housing components 1A, 1B relative to one another. The housing components 1A, 1B can thereafter be firmly coupled to one another.

Figure 2:
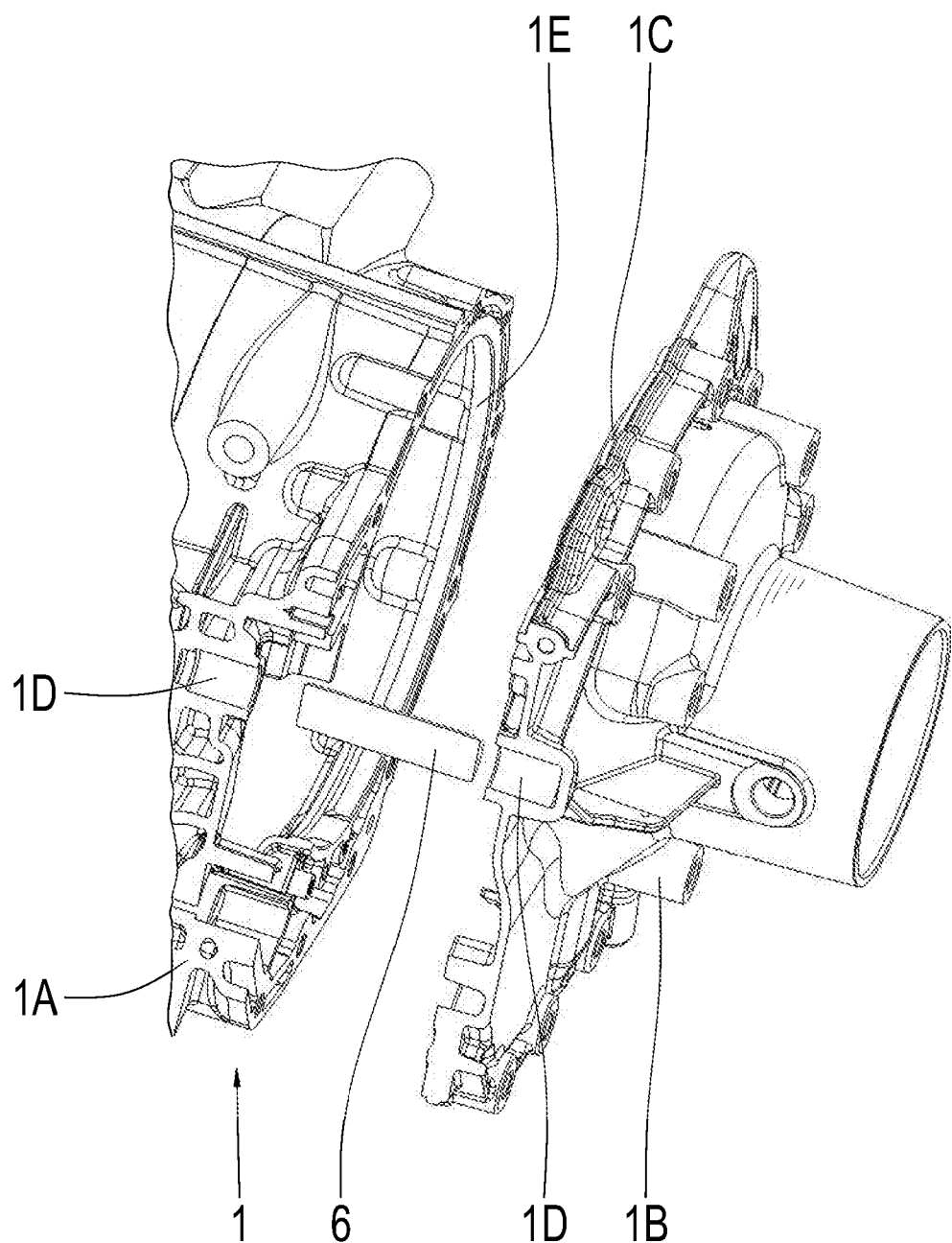
FIG. 2: A housing of an assembly, shown in a three-dimensional and partially sectioned, exploded representation.

FIG. 2 shows a specific embodiment of a housing 1 for an assembly, in particular for the motor-transmission assembly shown in FIG. 1. For greater clarity the housing components 1A, 1B are shown separated from one another in FIG. 2. The housing component 1B forms a housing cover for closing off the housing 1 axially. The shaft 6 is arranged between the housing components 1A, 1B. The shaft serves primarily for the support of a parking lock pawl. It also serves to align the housing components 1A, 1B. As already explained in connection with FIG. 1 the shaft 6, with its shaft ends, is inserted into the respective associated recesses 1D in the housing components 1A, 1B. To ensure the correct alignment correspondingly exact fits are provided for the ends of the shaft 6 in the recesses 1D.

A further alignment is brought about by the centering collar 1C on the end face of the housing component 1B. When the housing components 1A, 1B are fitted together, the collar comes into contact with a corresponding shoulder 1E on the end of the other housing component 1A facing toward it. The centering collar 1C and the shoulder 1E are designed to be complementary.

Figure 3:
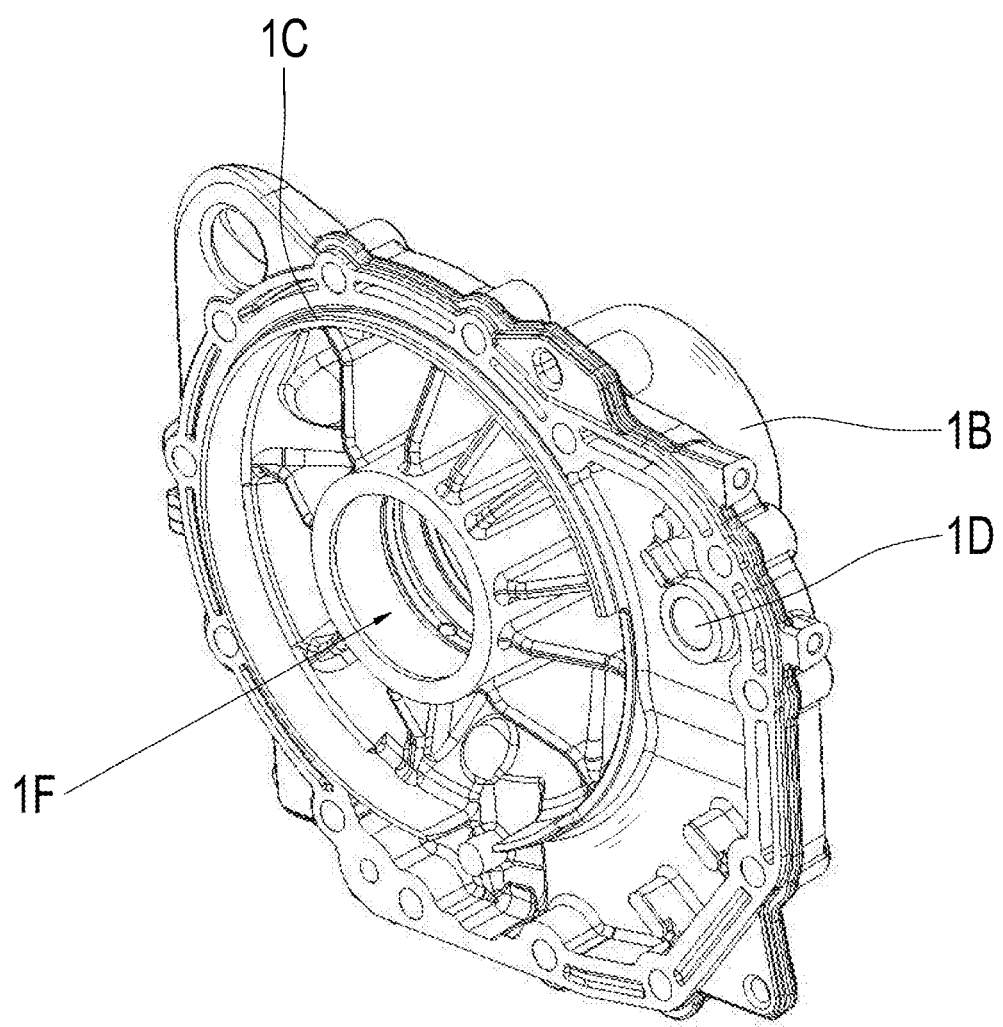
FIG. 3: A housing component of an assembly, represented in three dimensions.

FIG. 3 shows a different perspective of the housing component 1B in FIG. 2. In FIG. 3 the centering collar 1C can be seen particularly clearly as well as the recess 1D located radially outside relative thereto for the insertion of the shaft 6. Furthermore, an opening 1F in the housing component 1B for passing a driveshaft through can be seen. This can be the driveshaft 5 shown in FIG. 1. The centering collar 1C is circular and is located coaxially with the opening 1F. The recess 1D and hence also the shaft 6 are radially a distance away from the opening 1F.

Close to the recess 1D, the centering collar 1C has a cutout through which the parking brake pawl arranged on the shaft 6 can engage in the space radially inside the centering collar 1C. There, a set of teeth corresponding to the pawl are located. The teeth can be arranged rotationally fixed on the driveshaft which passes through the housing opening 1F, in particular on a parking brake wheel.

The invention claimed is:

1. A housing for an assembly of a vehicle drive-train comprising:
   a first housing component,
   a second housing component,
   the first and the second housing components being aligned with and coupled to one another, and
   a shaft being arranged inside the housing and supporting a structural element of the assembly within the housing, and the shaft is either a locking bolt or a parking brake bolt,
   the shaft being respectively supported in the first and in the second housing components, and
   the shaft being configured to align the first and the second housing components with one another,
   wherein one of the first and the second housing components comprises a centering collar and the other of the first and the second housing component has a shoulder that mates with the centering collar for aligning the first and the second housing components with one another, and the shaft ensures a rotationally correctly positioned alignment of the first and the second housing components with one another.

2. The housing according to claim 1, wherein the centering collar radially abuts the shoulder and is rotationally fixed relative to the one of the first and the second housing components.

3. The housing according to claim 1, wherein at least one of:
- the shaft has a larger axial extension than the centering collar,
- the shaft extends beyond the centering collar, and
- the shaft is axially fixed inside the housing when the first and the second housing components are coupled to one another.

4. The housing according to claim 1, wherein the centering collar and the shoulder are arranged on opposite end faces of the first and the second housing components, and, in each case, either an opening or a recess is provided in each of the end faces such that a respective end of the shaft is inserted into each of the respective openings or recesses.

5. The housing according to claim 1, wherein one of the first and the second housing components has an opening for passing a driveshaft of the assembly through the one of the first and the second housing components concerned, and the shaft is arranged radially a distance away from the opening.

6. The housing according to claim 1, wherein one of the first and the second housing components is a housing cover which closes off an end of the housing.

7. The housing according to claim 1, wherein the housing is a transmission housing.

8. A transmission for a vehicle drive-train, comprising:
- at least one transmission stage,
- a housing for accommodating structural elements of the transmission stage on an inside of the housing,
- the housing having a first housing component and a second housing component,
- the first and the second housing components being aligned with and coupled to one another,
- a shaft being arranged inside the housing and supporting a structural element of the assembly arranged inside the housing, and the shaft is either a locking bolt or a parking brake bolt,
- the shaft being respectively supported in the first and in the second housing components,
- the shaft being configured to align the first and the second housing components with one another, and
- the second housing component comprises a centering collar and the first housing component has a shoulder, the centering collar is received within and radially abuts the shoulder to align the first and the second housing components with one another, and the shaft ensures a rotationally correctly positioned alignment of the first and the second housing components with one another.

9. A method for producing a housing having a first housing component and a second housing component, the first and the second housing components are aligned with and coupled to one another, and a shaft is arranged inside the housing for supporting a structural element of the assembly arranged inside the housing, the shaft is either a locking bolt or a parking brake bolt, the shaft is supported respectively in the first and in the second housing components, the shaft being configured to align the first and the second housing components with one another, the method comprising:
- producing the first housing component;
- producing the shaft;
- producing the second housing component;
- inserting one end of the shaft into an opening or recess in an end face of the first housing component such that an other end of the shaft projects beyond the end face;
- bringing together the first and the second housing components so that the other end of the shaft is inserted into an opening or recess in an end face of the second housing component, such that a first alignment stage of the housing components with one another occurs; and
- bringing the first and the second housing components closer together such that a centering collar on one of the end faces is received within and mates with a corresponding shoulder on the other end face, such that a further alignment stage of the housing components with one another occurs.

* * * * *